2,833,752
Patented May 6, 1958

2,833,752
CROSS-LINKING OF FLUORINATED ELASTOMERS

Francis J. Honn, Westfield, and Willard M. Sims, Hackensack, N. J., assignors, by mesne assignments, to Minnesota Mining and Manufacturing Company, St. Paul, Minn., a corporation of Delaware No Drawing. Application June 14, 1954
Serial No. 436,714

18 Claims. (Cl. 260—87.7)

This invention relates to the cross-linking of polymers and, more particularly, to the modification of the characteristics of chain saturated polymers whose structure is composed substantially exclusively of carbon, hydrogen and halogen atoms. This applicaion is a continuation-in-part of application Serial No. 346,800, filed April 3, 1953.

Chain polymers are thermoplastic in nature. They exhibit continuous flow under the influence of heat and pressure. Such polymers can be resoftened as often as desired and are usually soluble in selected solvents.

Cross-linked or space polymers, on the other hand, are generally thermosetting, that is to say that they cannot be softened without decomposition once they have hardened, and that they are insoluble in all solvents. A chain polymer may, however, contain a small number of cross-linkages without completely losing its thermoplastic properties.

It is often desirable to convert chain to space polymers. This is done when it is desired to decrease solubility and thermoplastic flow and, in the case of chain elastomers, where it is desired to obtain a harder, tougher product. The cross-linking of elastomers is commonly referred to as vulcanization.

Vulcanized or cross-linked elastomers may have equal, greater or lesser extensibility than the linear elastomers, depending on the number and nature of the cross-linkages. In any case, they have lessened plasticity and solubility and increased toughness and heat resistance.

The nature of the cross-linking agent will vary with the nature of the chain polymer and with the nature of the cross-link desired. There are a number of reactions which may result in the cross-linking of a chain polymer. In some reactions the cross-linking agent will take part so that at least a portion of it forms the cross-link and appears in the final cross-linked molecule. In other reactions the cross-linking agent acts solely as an activator and does not appear in the final molecule.

The chemistry of cross-linking is imperfectly understood. Cross-linking agents successful with one type of chain polymer are often ineffective with another type. There appears to be no rule for predicting with accuracy whether or not a particular cross-linking agent effective with one type of chain polymer will be effective with another type. In fact, the term "cross-linking agent," itself, covers materials which are chemically and physically dissimilar and have in common the sole characteristic that each is effective for the cross-linking of at least one chain polymer.

Among the most useful of the thermoplastic resins are those prepared by the polymerization of highly halogenated monoolefins and particularly those prepared from highly fluorinated ethylenes. It is to be understood that the terms "halogenated" and "fluorinated" as used herein are intended to designate halogen or fluorine substitution on a material regardless of whether or not such substitution is obtained by direct halogenation or fluorination of the material so designated. These resins, particularly when they are at least half fluorinated i. e., containing fluorine substitution at at least half of the positions available for such substitution, have great chemical stability and are resistant to attack by many ordinarily corrosive substances. Among these resins, those containing disordered molecules have been found to have a higher degree of thermoplasticity and, in many cases, a high degree of elasticity, depending on the degree of disorder. Disorder in a chain polymer is often obtained by the copolymerization of mono-olefins, and for purposes of this invention, it is necessary that at least one of the co-monomer olefins should contain hydrogen.

For example, chlorotrifluoroethylene polymers have been developed to commercial success due to their unique combination of physical, chemical, and electrical properties. It has been found possible to modify some of these properties for greater utility in specific applications by the copolymerization of chlorotrifluoroethylene with hydrogen containing mono-olefins, such as vinylidene fluoride. These copolymers still retain many of the valuable properties of chlorotrifluoroethylene homopolymers, and particularly retain, to a large degree, the property of chemical inertness.

It has been found that copolymers of chlorotrifluoroethylene and vinylidene fluoride containing up to about 5 mole percent of vinylidene fluoride are more thermoplastic than the homopolymer of chlorotrifluoroethylene and can, therefore, be molded easily into thin shapes which are difficult to mold with the homopolymer. Copolymers of chlorotrifluoroethylene and between 20 and 30 mole percent of vinylidene fluoride are soluble at ambient temperatures in oxygenated organic solvents, such as esters, ketones and cyclic ethers, and may be applied as coatings from such solutions. It has also been found that copolymers of chlorotrifluoroethylene and vinylidene fluoride containing from about 30 to 80 percent of vinylidene fluoride are elastomeric in nature and retain their elastomeric properties over a wide temperature range. All of these copolymers are chemically inert to a large degree.

It is an object of this invention to cross-link highly halogenated chain saturated polymers whose structure is composed substantially exclusively of carbon, hydrogen, and halogen atoms.

It is a further object of this invention to cross-link chain polymers prepared by the copolymerization of a highly fluorinated mono-olefin with a mono-olefin containing hydrogen.

It is a further object of this invention to prepare soft vulcanizates of highly fluorinated, linear, saturated, hydrogen-containing elastomers of increased toughness and heat stability, but adequate or even superior extensibility.

It is a further object of this invention to produce hard thermosetting vulcanizates of highly fluorinated, linear, saturated, hydrogen-containing elastomers.

It is a further object of this invention to reduce the solubility of highly fluorinated, linear, saturated, hydrogen-containing elastomers produced by the copolymerization of at least two mono-olefinic compounds, at least one of which is highly halogenated and at least one of which contains hydrogen.

It is a further object of this invention to produce tough, chemically inert coatings from solutions of highly fluorinated, saturated, linear, hydrogen-containing elastomers.

It is a further object of this invention to produce tough, chemically inert, self-supporting films from solutions of highly fluorinated, saturated, linear, hydrogen-containing elastomers.

Other objects will appear hereinafter.

These and other objects are accomplished by the following invention:

Highly halogenated chain polymers whose structure is composed substantially exclusively of carbon, hydrogen and halogen atoms, are reacted at elevated temperatures with an organic peroxy compound which is stable against decomposition below about 50° C., and with a basic metal compound, to produce a cross-linked polymer. It is preferred that the chain polymers be at least half fluorinated and that —$CH_2$— groups be present. In other words, at least some of the carbon atoms on the chain should be bonded only to hydrogen atoms and other carbon atoms.

Chain polymers with a minor degree of disorder in their molecules are generally more thermoplastic in nature than those without such disorder. Elasticity requires a greater degree of disorder. In order to obtain an elastomeric product, at least 10 percent of the carbon atoms in the structure must be of the type which are bonded only to hydrogen atoms and other carbon atoms. Ordinarily, a mono-olefinic compound containing a $CH_2$= group is used to provide these carbon atoms, and this results in chains containing —$CH_2$— groups. Ordinarily, such a mono-olefinic compound is copolymerized with another highly fluorinated mono-olefin to help give the polymer molecule its highly fluorinated nature.

Among the highly fluorinated mono-olefins which may be used as comonomers are: $CF_2$=$CFCl$, $CF_2$=$CCl_2$, $CF_3$—$CF$=$CF_2$, $CF_2$=$CHCl$, $CF_3$—$CCl$=$CCl$—$CF_3$, $CF_2$=$CHF$, $CF_3$—$CH$=$CH$—$CF_3$(cis or trans), $CF_2$=$CF_2$,

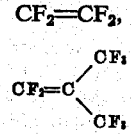

$CF_2$=$CFBr$, $CF_2$=$CCl$—$CF_3$, $CF_3$—$CH$=$CH_2$ and $CF_3$—$CCl$=$CCl_2$.

Among the hydrogen containing mono-olefins which may be used as comonomers with the above highly fluorinated mono-olefins are: $CF_2$=$CH_2$, $CFH$=$CH_2$, $CH_2$=$CH_2$, $CFCl$=$CH_2$, $CCl_2$=$CH_2$, $CClH$=$CH_2$, $CHBr$=$CH_2$ and

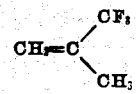

Of these, the most advantageous combinations are:

$CF_2$=$CFCl/CF_2$=$CH_2$; $CF_2$=$CF_2/CF_2$=$CH_2$
$CF_2$=$CF_2/CH_2$=$CFCl$, and $CF_2$=$CFBr/CF_2$=$CH_2$ The aforementioned mono-olefins may be copolymerized in any proportions, depending on the characteristics desired. Good chemical stability requires fluorine substitution at at least one-half of the possible positions for such substitution in the polymer chain.

It is to be noted that all of the monomers enumerated above contain only carbon, hydrogen and halogen atoms and, therefore, produce copolymers substantially without markedly reactive functional groups. This, of course, does not preclude the presence of other atoms in end groups which might be formed by chain stoppers in the polymerization zone, present by design or by accident. Such end groups are relatively few in number and are difficult to detect. They do not, in any way, affect the characteristics of the polymer to any noticeable degree.

The copolymerization reaction may be carried out in either a water suspension type system or in a mass polymerization system. In the former system the reaction is preferably carried out at a temperature between about 0° C. and about 35° C. In a mass polymerization system the reaction is preferably carried out at a temperature between about —20° C. and about 0° C. With the water suspension type system a redox catalyst system is preferred. It has and contains an oxidant, a reductant and a variable valence metal salt. The oxidant in the water suspension type recipe is preferably an inorganic persulfate, such as potassium persulfate, sodium persulfate or ammonium persulfate. The reductant is preferably a bisulfite, such as sodium bisulfite or potassium bisulfite. The variable valence metal salt which is employed for the purpose of regenerating the oxidant is preferably in the form of an iron salt, such as ferrous sulfate or ferrous nitrate with ferrous sulfate being the most desirable variable valence metal salt.

In the mass polymerization system, organic peroxide promoters, and particularly halogen-substituted acyl peroxide are used. Trichloroacetyl peroxide is a preferred promoter of this type. Other halogen-substituted organic peroxides suitable for carrying out the polymerization are trifluoroacetyl peroxide, difluoroacetyl peroxide, 2,4-dichlorobenzoyl peroxide, chloroacetyl peroxide, trifluorodichloropropionyl peroxide, and dichlorofluoroacetyl peroxide.

By the method of this invention these copolymers may be cross-linked to produce from the elastomers either soft vulcanizates of increased strength and toughness, of decreased soubility, and of adequate or even increased extensibility, or hard vulcanizates which are thermosetting. From the thermoplastic resin a formed thermosetting resin may be produced.

The organic peroxy compounds used in this invention must be stable below about 50° C., or else they will cause cross-linking while they are being blended into the copolymer. Among these compounds are the acyl and acoyl peroxides and hydroperoxides, such as ditertiary butyl peroxide, dilauryl peroxide, dibenzoyl peroxide, p-chlorodibenzoyl peroxide, cyclohexanone hydroperoxide and ditertiary butyl hydroperoxide. The organic peroxy compounds also include peresters, such as alkyl and aryl perbenzoates and perphthalates, including specifically ditertiary butyl perbenzoate and ditertiary butyl diperphthalate. Peracids, such as tertiary butyl permaleic acid and perlauric acid, are also included.

Among the basic metal compounds which may be used, the preferred compounds are the basic oxides, such as magnesium oxide, calcium oxide, zinc oxide and lead oxide (PbO). Other basic metal compounds which may be used include both inorganic and organic metal compounds which are acid acceptors, such as magnesium carbonate, calcium carbonate, calcium acetate, tetraphenyl tin, tetraethyl lead, and sodium methylate.

While it is not desired to be bound by any particular theory of operation, it is believed that the peroxy-type compounds remove a hydrogen atom from a carbon atom on the linear chain and thereby produce an activated free radical spot on the chain. This spot links directly to a similar free radical spot on another chain, and thus produces a cross-linked polymer. It is believed that the basic metal compound helps to remove the hydrogen atom and to neutralize it after removal, and thereby facilitates the cross-linking reaction.

The cross-linking reaction may require or may produce materials which have an adverse effect on the properties of the cross-linked polymer. For example, the metallic salts produced by the reaction of the inorganic basic metal compounds with the acidic hydrogen removed from the polymer chain, might reduce the chemical inertness and electrical resistance of the polymer. However, since relatively few cross-linkages are required to produce a substantial alteration in the characteristics of the polymer, relatively small amounts of cross-linking agents are required. In producing a cross-linked polymer for special purposes where a high degree of chemical inertness or electrical resistance is required, conditions may be controlled so that a minimum of undesired material remains in the polymer.

There are several methods of reacting the chain polymers with the cross-linking agents of this invention, depending on the character of the polymer, the character of the cross-linking agent and the character of the desired product. Cross-linking agents may be easily incorporated into the elastomers by mechanical mixing, either with or without plasticizers. Such mechanical mixing involves shearing forces and is carried out in equipment such as 2-roll mills, Banbury (internal) mixers and screw-type plasticators, which resemble extruders. Somewhat elevated temperatures of the order of from about 50° to about 75° C. ordinarily prevail in the mixing operation due to the mixing action itself. Articles to be molded are then heated in the mold with additional heat, as by hot air, steam or hot-press platens, thereby shaping and cross-linking simultaneously. The temperature in the mold may range from about 100° C. to 200° C.

Since mechanical mixing generates heat and since it is difficult to blend other materials into a cross-linked polymer, it is usually desirable to blend other materials into the polymer first and then add the linking agents last, just before fabrication. Among the other materials which might be added to the aforesaid polymers prior to cross-linking are fillers, pigments and plasticizers.

With certain polymers and for certain uses, particularly for coatings, polymers may be cross-linked from solutions. The polymer and linking agents are blended together and then dissolved in a suitable solvent. When the basic metal compound is an insoluble compound, such as zinc oxide, it remains suspended in the viscous solution. The solution is applied to a surface, such as a fabric or a metal, and then the coating is dried and heated to cross-link the polymer. In some cases, the coating is adherent and in other cases, it may be stripped off to form a self-supporting film of cross-linked polymer.

Still another method of cross-linking a chain polymer involves the use of a milky emulsion or "latex." As stated above, the copolymerization product of chlorotrifluoroethylene and vinylidene fluoride may be prepared in a water suspension type system. In such a system the product is removed from the reactors as a latex. For most purposes, the dry rubbery copolymer is recovered by coagulation of the latex with salts and acids followed by washing and drying. For other purposes, however, such as dip coating and spraying, the latex can be used directly. In these cases, the other ingredients (fillers, cross-linking agents, etc.) are dispersed in water containing a surface-active agent, and these dispersions are blended with the latex. The latex is then applied as a coating to a surface (similar to the solutions disclosed above) and the polymer is cross-linked as the latex is dried and heated.

Non-elastomeric chain polymers may be cross-linked after molding to produce articles which do not flow at elevated temperatures. The molding powder may be blended with the peroxy-type compound and the basic metal compound, and the mixture may then be molded as usual. After molding, the article is heated in the mold for an extended period and then may be heated after removal from the mold in an oven to complete the cure.

Still another method of reacting the chain polymer, whether elastomeric or not, with the peroxide cross-linking agent, involves the reaction of the peroxide with the polymer in its finished, fabricated state. Since this method involves the penetration of the polymer by the reactant peroxides, it is adaptable primarily to very thin sections of polymer, such as in coatings or in unsupported films. The coating or film is maintained in contact with a mixture of the peroxy-type compound and the basic metal compound, at elevated temperatures and preferably under pressure, for a period of time ranging from a few seconds to several days. This results in the changing of the characteristics of the chain polymer to those of a space polymer.

The proportions of peroxy-type compound and basic metal compound used in the cross-linking of the highly fluorinated polymers of this invention will vary with the nature of the polymer, the nature of the peroxy-type compound, the nature of the basic metal compound, the method, time and temperature of curing and the degree of cross-linking desired. In general, for each 100 parts by weight of highly fluorinated polymer, the weight of peroxy-type compound will vary from about 0.5 to about 5 parts by weight. The amount of basic metal compound will vary from about 1 to about 20 parts by weight.

The temperature and time of curing will also vary with the nature of the polymer to be cured, the nature of the peroxy-type compound and the basic metal type compound and the degree of cross-linking desired. In general, the temperature of curing may vary from about 75° C. to about 200° C. The time of curing may vary from about 5 minutes to about 16 hours.

EXAMPLE I 100 parts by weight of an equimolar chlorotrifluoroethylene-vinylidene fluoride copolymer were banded on a cooled mill. .5 parts by weight of zinc oxide was then added and blended into the rubbery copolymer. 1.65 parts by weight of benzoyl peroxide (90%) was ground to a fine powder and dispersed into the rubbery matrix on the mill. The blend was then milled thoroughly and sheeted for pressing. A sheet of this blend was press cured in a standard rubber mold measuring 6" square by 0.078 inch deep at 200 pounds per square inch and 100° C. for one-half hour. The press cured sheet was then cured in an oven at 150° C. for one hour. The cured sheet was white in color and had smooth texture with a glossy surface. It was completely free of bubbles or flow lines.

*Physical data*

| Treatment | Stress at 300% E (p. s. i.) | Tensile Strength (p. s. i.) | Percent Elongation | Shore Hardness A (5 sec.) |
|---|---|---|---|---|
| Press cure | 200 | 350 | 750 | 40 |
| Press cure plus oven cure | 320 | 1,160 | 575 | 47 |

EXAMPLE II 100 parts by weight of an equimolar chlorotrifluoroethylene-vinylidene fluoride copolymer was blended by a procedure similar to that of Example I, with 5 parts by weight of zinc oxide and 3.2 parts by weight of benzoyl peroxide. A sheet was press cured for one-quarter hour at 110° C. and oven cured for two hours at 150° C.

*Physical data*

| Treatment | Stress at 300% E (p. s. i.) | Tensile Strength (p. s. i.) | Percent Elongation | Shore Hardness A (5 sec.) |
|---|---|---|---|---|
| Press cure plus oven cure | 350 | 770 | 500 | 45 |

EXAMPLES III TO VII

Additional blends, in accordance with the following recipes, were made in accordance with the foregoing procedure to produce results as outlined in the table below:

| Example No. | III | IV | V | VI | VII |
|---|---|---|---|---|---|
| Recipe No. | 61 | 74 | 88 | 100 | 101 |
| Parts by weight of: | | | | | |
| Equimolar $CF_2=CFCl/CF_2=CH_2$ copolymer | 100 | 100 | 100 | 100 | 100 |
| ZnO | 10 | | | | |
| CaO | | 10 | | | |
| PbO | | | 10 | | |
| MgO | | | | 10 | |
| Sodium methylate | | | | | 5 |
| Benzoyl peroxide | 3 | 3 | 3 | 3 | 3 |
| Cure: | | | | | |
| Press, hr./° C | ½/110 | ½/110 | ½/110 | ½/110 | ½/110 |
| Oven, hr./° C | 16/149 | 16/149 | 16/149 | 16/149 | 16/149 |
| Physical Prop.: | | | | | |
| Stress @ 300% E (p. s. i.) | 530 | 490 | 380 | 615 | 330 |
| Tensile strength (p. s. i.) | 1,350 | 1,740 | 1,425 | 1,505 | 775 |
| Percent Elongation | 500 | 475 | 790 | 560 | 700 |
| Shore A Hardness | 47 | 49 | 50 | 52 | 49 |

We claim:

1. A method of cross-linking a chain saturated polymer, containing fluorine substitution at at least half the positions available for such substitution and composed substantially exclusively of carbon, hydrogen and halogen atoms which comprises heating said polymer in the presence of an organic peroxy compound which is relatively stable at temperatures below about 50° C. and in the presence of a basic metal compound.

2. The method of claim 1 wherein the chain polymer is a copolymer of a mono-olefinic compound containing a high degree of fluorine substitution and a mono-olefinic compound containing hydrogen, both compounds containing no atoms other than carbon, hydrogen and halogen atoms.

3. The method of claim 2 wherein the hydrogen containing mono-olefinic compounds contains $CH_2=$ groups.

4. The method of claim 2 wherein the hydrogen containing mono-olefinic compounds is vinylidene fluoride.

5. The method of claim 2 wherein the mono-olefinic compound containing a high degree of fluoride substitution is chlorotrifluoroethylene.

6. A method of vulcanizing a chain saturated elastomer, containing fluorine substitution at at least half the positions available for such substitution and composed substantially exclusively of carbon, hydrogen and halogen atoms, at least 10% of the carbon atoms being bonded solely to hydrogen atoms and other carbon atoms, which comprises heating said elastomer in the presence of an organic peroxy compound which is relatively stable at temperatures below about 50° C. and in the presence of a basic metal oxide.

7. The method of claim 6 wherein at least about 10% of the carbon atoms are in —$CH_2$— groups.

8. The method of claim 7 wherein the chain saturated elastomer is a copolymer of vinylidene fluoride and chlorotrifluoroethylene.

9. The method of claim 8 wherein the peroxy compound is an organic peroxide.

10. The method of claim 9 wherein the organic peroxide is benzoyl peroxide.

11. The method of claim 9 wherein the organic peroxide is p-chlorodibenzoyl peroxide.

12. The method of claim 8 wherein the peroxy compound is ditertiarybutyl perbenzoate.

13. The method of claim 8 wherein the basic compound is zinc oxide.

14. The method of claim 8 wherein the basic compound is magnesium oxide.

15. The method of claim 8 wherein the basic compound is lead oxide (PbO).

16. The method of claim 8 wherein the basic compound is sodium methylate.

17. A method of preparing a cross-linked film of a highly halogenated polymer which comprises dissolving in a suitable solvent a chain saturated polymer, containing fluorine substitution at at least half the positions available for such substitution and composed substantially exclusively of carbon, hydrogen and halogen atoms and an organic peroxide, slurrying into the solution between about 3 and about 30 weight percent of a basic metal oxide, applying the slurry to a surface, drying the slurry to leave a deposit of polymer, peroxide and basic metal oxide in intimate mixture on the surface and heating the deposit at an elevated temperature to form a cross-linked film.

18. The method of claim 17 wherein the polymer is an elastomeric copolymer of vinylidene fluoride and chlorotrifluoroethylene containing from about 30 to about 80 mole percent of vinylidene fluoride.

References Cited in the file of this patent

UNITED STATES PATENTS

| 2,157,997 | Brous | May 9, 1939 |
| 2,446,984 | Rogers | Aug. 10, 1948 |
| 2,495,286 | Brubaker | Jan. 24, 1950 |
| 2,628,214 | Pinkney et al. | Feb. 10, 1953 |

FOREIGN PATENTS

| 496,279 | Canada | Sept. 22, 1953 |

OTHER REFERENCES

"Polyethylene" (Raff et al.). Published by Interscience Publishers Inc. (1956), New York, p. 137.